United States Patent
Filart et al.

(10) Patent No.: US 9,826,072 B1
(45) Date of Patent: Nov. 21, 2017

(54) NETWORK-TERMINAL INTEROPERATION USING COMPATIBLE PAYLOADS

(71) Applicant: T-Mobile USA, Inc., Bellevue, WA (US)

(72) Inventors: Homer Nicolas B. Filart, Renton, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/280,234

(22) Filed: Sep. 29, 2016

(51) Int. Cl.
*H04L 12/28* (2006.01)
*H04L 12/56* (2006.01)
*H04L 29/06* (2006.01)
*H04W 88/18* (2009.01)

(52) U.S. Cl.
CPC .......... *H04L 69/22* (2013.01); *H04L 65/1006* (2013.01); *H04L 65/601* (2013.01); *H04L 65/607* (2013.01); *H04L 69/24* (2013.01); *H04W 88/181* (2013.01)

(58) Field of Classification Search
None
See application file for complete search history.

(56) References Cited

U.S. PATENT DOCUMENTS

| | | |
|---|---|---|
| 2003/0229699 A1 | 12/2003 | Moran et al. |
| 2004/0264482 A1* | 12/2004 | Kang ............... H04L 29/06027 370/401 |
| 2008/0240091 A1 | 10/2008 | Kesavan et al. |
| 2009/0006533 A1 | 1/2009 | Guo |
| 2009/0154658 A1 | 6/2009 | Kasper et al. |
| 2010/0144325 A1 | 6/2010 | Roundtree et al. |
| 2011/0136483 A1 | 6/2011 | Dwight et al. |
| 2011/0222532 A1 | 9/2011 | Noldus |
| 2011/0310884 A1 | 12/2011 | Arauz-Rosado |
| 2012/0002718 A1 | 1/2012 | Jun et al. |
| 2012/0244861 A1 | 9/2012 | Agarwal et al. |
| 2013/0024332 A1 | 1/2013 | Cai et al. |

(Continued)

OTHER PUBLICATIONS

"ETSI TS 123 334 v 13.5.0, Technical Specification", Apr. 2016, pp. 1, 4-8, 10-18, 29-46.

(Continued)

*Primary Examiner* — Edan Orgad
*Assistant Examiner* — Rebecca Song
(74) *Attorney, Agent, or Firm* — Lee & Hayes, PLLC; Robert C. Peck; Christopher J. White

(57) ABSTRACT

An anchoring network device of a telecommunications network can receive a first initiation request of a communication session and determine a second request indicating a different media capability than the first request. The different capabilities can share a payload format. A network gateway can modify headers of packets to change between the capabilities. In some examples, the anchoring device can determine that a codec list of the initiation request corresponds to a rewrite rule. The device can apply the rewrite rule to the request to provide a second request listing a second, different codec. The first codec and the second codec can both be associated with a common payload format. The network gateway can modify first packets from a first to a second terminal to replace first-codec headers with second-codec headers and vice-versa.

17 Claims, 10 Drawing Sheets

(56) References Cited

U.S. PATENT DOCUMENTS

| | | | |
|---|---|---|---|
| 2013/0212293 A1 | 8/2013 | Friedman | |
| 2013/0290494 A1 | 10/2013 | Goudarzi et al. | |
| 2014/0328323 A1* | 11/2014 | Zhang | H04L 69/24 370/331 |
| 2014/0342739 A1* | 11/2014 | Hori | H04W 36/0022 455/436 |
| 2015/0350983 A1 | 12/2015 | Kwok et al. | |
| 2016/0021336 A1 | 1/2016 | Abbott et al. | |
| 2016/0072868 A1 | 3/2016 | Poulin | |
| 2016/0105468 A1 | 4/2016 | Mufti et al. | |
| 2016/0127295 A1 | 5/2016 | Karimli et al. | |
| 2016/0308919 A1* | 10/2016 | Hori | H04L 65/1006 |

OTHER PUBLICATIONS

"ETSI TS 126 171 v13.0.0, Technical Specification", Jan. 2016, 14 pages.
"ETSI TS 126 190 v13.0.0, Technical Specification", Jan. 2016, pp. 1, 4-8, 13-14, 50-51.
"ETSI TS 126 201 v13.0.0, Technical Specification", Jan. 2016, 25 pages.
"ETSI TS 126 202 v13.0.0, Technical Specification", Jan. 2016, 15 pages.
"ETSI TS 126 441 v13.0.0, Technical Specification", Jan. 2016, 14 pages.
"ETSI TS 126 445 v 13.1.0, Technical Specification", May 2016, pp. 1, 4-16, 17, 20-24, 415-416, 443-445, 606-625, 536, and 638-654.
"ETSI TS 126 446 v 13.0.0, Technical Specification", Jan. 2016, 10 pages.
"EVS Registration IANA" retrieved Jul. 28, 2016, at <<https://www.iana.org/assignments/media-types/audio/EVS>>, 4 pages.
Jarvinen, K., "Enhanced Voice Services Codec for LTE", retrieved Jul. 12, 2016 at <<http://www.3gpp.org/news-events/3gpp-news/1639-evs_news>>, 2 pages.
The PCT Search Report and Written Opinion dated Jan. 22, 2016 for PCT application No. PCT/US2015/054233, 15 pages.
Sjoberg, J., et al., "RTP Payload Format and File Storage Forma for the Adaptive Multi-Rate (AMR) and Adaptive Multi-Rate Wideband (AMR-WB) Audio Codecs", RFC 4867 (Standards Track), Apr. 2007, pp. 1-4, 13-34, 44-47.
"Volte—Some Thoughts on Codec Negotiation", retrieved Jul. 28, 2016, from <<https://blog.wirelessmoves.com/2016/03/volte-some-thoughts-on-codec-negotiation.html>>, 3 pages.
"H.248", Wikipedia, retrieved on Dec. 20, 2016 from <<https://en.wikipedia.org/wiki/H.248>>, 6 pages.
Office Action for U.S. Appl. 14/788,591, dated May 2, 2017, Mufti et al., "Service Capabilities in Heterogeneous Network", 22 pages.
Schulzrinne, H.and T. Taylor, "RTP Payload for DTMF Digits, Telephony Tones, and Telephony Signals", The IETF Trust, Dec. 2006, 49 pages.
Office Action for US Patent Application, dated Aug. 18, 2017, Mufti, "Service Capabilities in Heterogeneous Network" 34 pages.
Rosenberg, J. et al., "SIP: Session Initiation Protocol", Standards Track, Request for Comments 3261, Jun. 2002, pp. 1, 10-18 and 86-89.

* cited by examiner

NETWORK-TERMINAL INTEROPERATION USING COMPATIBLE PAYLOADS

BACKGROUND

A computing device configured for telecommunications, such as a wireless phone, is generally capable of processing various types and encodings of media. However, not all telecommunications devices connectable via a particular network necessarily support the same types or encodings. This can restrict users' ability to communicate with other users having different types of telecommunications devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. The figures are not necessarily to scale.

For brevity of illustration, in the diagrams herein, an arrow beginning with a diamond connects a first component or operation (at the diamond end) to at least one second component or operation that is or can be included in the first component or operation in at least one example.

DETAILED DESCRIPTION

Overview

Figure 1:
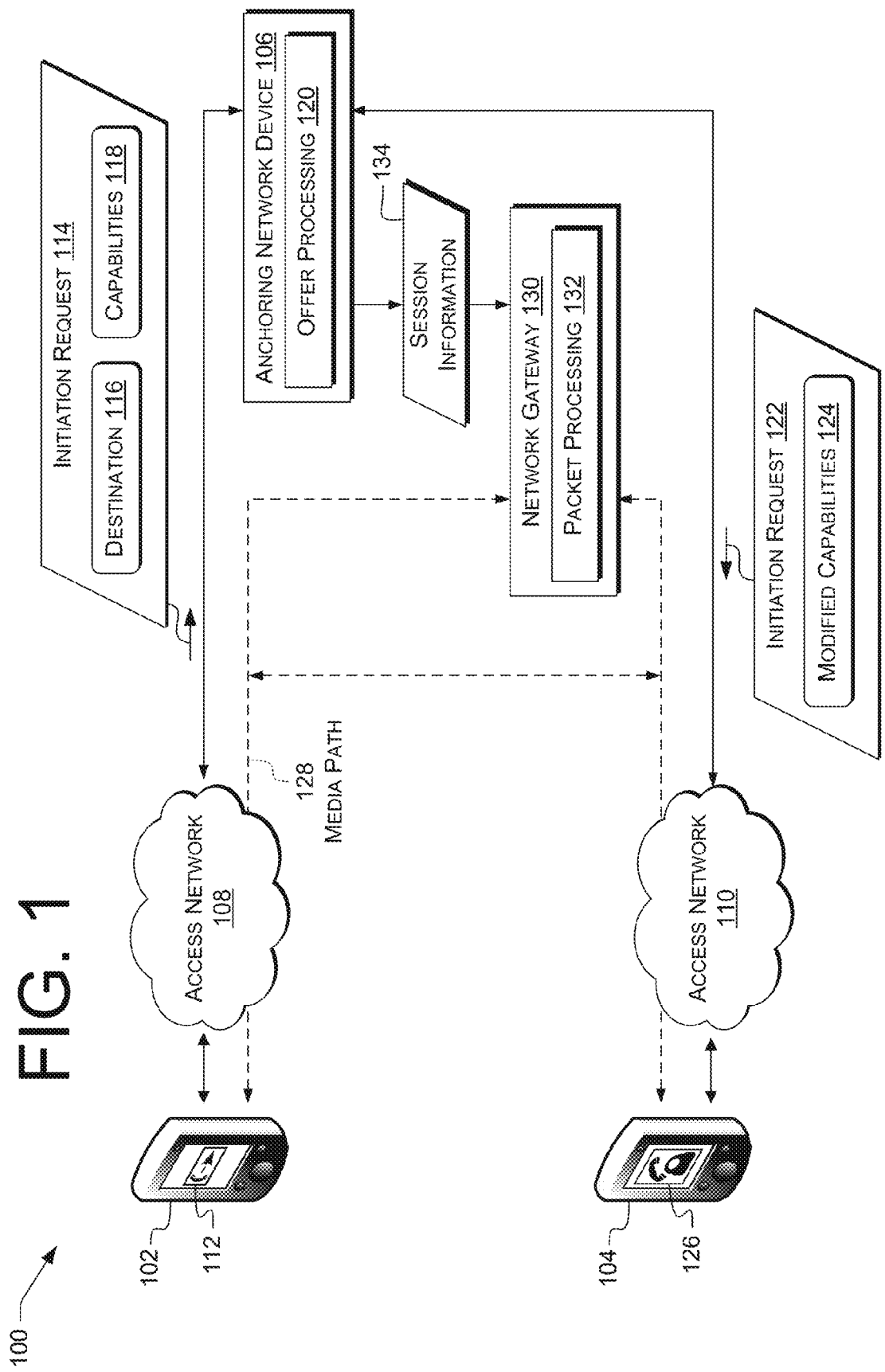
FIG. 1 is a block diagram illustrating a telecommunication system for implementing capability-information modification according to some implementations.

As used herein, a "terminal" is a communication device, e.g., a cellular telephone or other user equipment (UE), configured to perform, or intercommunicate with systems configured to perform, techniques described herein. Terminals can include, e.g., wireless voice- or data-communication devices. A terminal can include a user interface (e.g., as does a smailphone), but is not required to. For example, an example terminal can be a mobile hotspot such as an access point for an Institute of Electrical and Electronics Engineers (IEEE) 802.11 (WIFI) network using LTE as an upstream connection. Such a terminal may not include a user interface.

Systems and techniques described herein permit terminals to communicate data, e.g., voice or video, even when one of the terminals supports a media type, encoding, or format that another one of the terminals does not. As used herein, the terms "capabilities" and "media capabilities" refer to data types, encodings, formats, bit rates, protocols, underlying protocols, compression techniques, profiles, or coding/decoding procedure (codecs) that are supported by a terminal for the exchange of data with other terminals. The term "session" as used herein includes a communications path for bidirectional exchange of data among two or more terminals. Example sessions include voice and video calls, e.g., by which human beings converse, a data communication session, e.g., between two electronic systems or between an electronic system and a human being, or a Rich Communication Services (RCS, also known as JOYN) session. Systems and techniques herein permit terminals having certain capabilities to communicate with terminals not having those capabilities, e.g., without requiring computationally-expensive transcoding or other manipulation of the payloads of packets of the session. In some examples, the communication is facilitated transparently to the intercommunicating terminals.

Many networks are "heterogeneous networks," i.e., networks including terminals with various sets of capabilities. For example, many Long Term Evolution (LTE) cellular networks support voice over LTE (VoLTE) and also interconnect with the public switched telephone network (PSTN). Voice calls over VoLTE may be encoded or decoded using any one of a variety of codecs, e.g., an adaptive multi-rate (AMR) codec. Wideband AMR (AMR-WB), for example, encodes audio data in the frequency range of approximately 50 Hz-7000 Hz into compressed data at bit rates between, e.g., 6.6 kbps and 23.85 kbps, e.g., 12.65 kbps. Another example of a codec is narrowband AMR (AMR-NB), which encodes audio data in the frequency range of approximately 200 Hz-3400 Hz. The Enhanced Voice Services (EVS) codec, defined in Third-Generation Partnership Project (3GPP) TS 26.441 and related standards, is being deployed and permits transmitting 16-bit linear pulse code modulated (PCM) audio samples covering frequency ranges up to 16 kHz (super wide-band, SWB) or up to 20 kHz (full-band, FB) at sampling rates of 8 kHz, 16 kHz, 32 kHz, or 48 kHz. Compressed EVS data can have bit rates between 5.9 kbit/s and 128 kbit/s, or between 6.6 kbit/s and 23.85 kbit/s for interoperability with AMR-WB. EVS can, e.g., provide the same audio quality as some prior codecs even in the presence of 2 dB additional path loss. This permits maintaining audio quality farther from the antenna, increasing the coverage radius and reducing the cost and energy consumption of network infrastructure.

As AMR-WB, EVS, and other new codecs are developed, voice calls between VoLTE terminals may require transcoding or specific codec selection if one VoLTE terminals supports a codec, such as EVS, that the other VoLTE terminal does not. Similarly, transcoding may be required for interworking with environments such as personal computers (PCs), which can use codecs such as Vorbis, e.g., in an Ogg container, or Opus, used in the WebRTC (Web Real-Time Communication) protocol. Transcoding may also be required for interworking with the PSTN, which generally carries uncompressed audio in the 300 Hz-3400 Hz band formatted according to the International Telecommunications Union (ITU) G.711 standard as uncompressed, 8-bit pulse code modulated (PCM) logarithmically-quantized samples. However, transcoding can be computationally expensive, and can introduce latency in to transmission of packets of a communication session. Therefore, it is desirable to avoid transcoding whenever possible.

Codecs are also used for video. Example codecs used in LTE networks include ITU H.263, Moving Picture Experts Group (MPEG) standards such as MPEG-4 part 2, and H.264/MPEG-4 part 10. However, many other video codecs are used in other environments, e.g., Theora, QUICKTIME, VP6, and VP8 in personal computer (PC) environments, and MPEG-1 and MPEG-2 in older PCs or telecommunication systems. As with audio, video communications between terminals with different codec capabilities may require transcoding or specific codec selection. Video transcoding can be computationally expensive.

Some codecs include backward-compatible or "interoperable" (TO) modes. In these modes, the payload provided by an encoder of one codec can be decoded by a decoder of another codec. For example, an EVS encoder operating in IO mode produces a core frame, representing the encoded audio, than can be decoded without change by an AMR-WB decoder. Similarly, an AMR-WB encoder produces a core frame that can be decoded without change by an EVS IO-mode decoder. The AMR-WB core frame is described in 3GPP TS 26.201 v13.0.0 §4.2. A telecommunications network carrying session between EVS and AMR-WB terminals can facilitate interworking between EVS IO mode terminals and AMR-WB terminals, without transcoding, by changing the codec headers of relevant packets. As used herein, a "codec pair" is a set of two (or more) codecs that share a payload format, as discussed in more detail below. The term "packet" is used herein to refer generally to data packets, frames, datagrams, or any other identifiable units of data that include a header and a payload and that are transmitted or received via a communication network.

Various examples using codec pairs herein permit interworking advanced techniques with installed equipment not supporting those techniques. For example, various techniques herein permit interworking EVS IO-mode codecs on a VoLTE network with non-EVS-capable, AMR-WB VoLTE user equipment. Various examples herein permit interworking between circuit-switched (CS) and packet-switched (PS) environments, or between cellular and PC environments. Various examples herein permit additional or removal of offered codecs or other capabilities that are applicable to the calling party's network, terminal, or environment, but not applicable to the called party's network, terminal, or environment (e.g., VoIP calls from a Web browser or IPAD application using Opus via a WebRTC gateway to an IMS subscriber, or vice versa). Such interworking can permit introducing new voice-enhanced codecs or other capabilities, e.g., in the IMS core with 3GPP access (e.g., VoLTE) or non-3GPP access (e.g., Wireless Local Area Network, WLAN, or WebRTC).

In a nonlimiting example, if a SIP transmission (e.g., an INVITE or response) expresses a preference for AMR-WB, an anchoring network device can amend the transmission to include EVS IO mode as preferred over AMR-WB. In this way, if one party supports EVS IO mode and the other supports AMR-WB, those two will be used rather than causing the EVS party to fall back to AMR-WB. The EVS party can therefore benefit from using EVS rather than AMR-WB, while still being able to communicate with the AMR-WB party. This technique can also be used for other backward-compatible codec sets.

In some examples, a telecommunication system can include an anchoring network device and a network gateway. The anchoring network device can receive, from a first terminal, a first initiation request of a communication session, the first initiation request indicating a first media capability associated with a payload format. The anchoring network device can determine a second initiation request based at least in part on the first initiation request, the second initiation request indicating a second media capability different from the first media capability and associated with the payload format. The anchoring network device can then provide the second initiation request to a second terminal. The network gateway can modify a header of a first packet from a sending terminal of the first terminal and the second terminal to provide a second packet. The first packet can be associated with a sending media capability, the second packet can be associated with a receiving media capability, and both the first packet and the second packet can be associated with the payload format. The sending media capability can be one, and the receiving media capability the other, of the first media capability and the second media capability.

In some examples, an initiation request of a communication session can be received, e.g., by a core device of a network. It can be determined that a codec list of the initiation request corresponds to a predetermined rewrite rule, wherein the codec list includes a first codec. The rewrite rule can be applied to the initiation request to provide a second initiation request having a second codec list including a second, different codec. The first codec and the second codec can both be associated with a common payload format.

In some examples, first packets originating at a first terminal and intended for a second terminal can be modified, e.g., by a gateway device, to replace first-codec headers with second-codec headers. The first codec and the second codec can both be associated with a common payload format. Second packets originating at the second terminal and intended for the first terminal can be modified to replace second-codec headers with first-codec headers.

Illustrative Configurations

FIG. 1 is a block diagram illustrating a telecommunication system 100 according to some examples. The system includes terminals 102 and 104, e.g., user equipment or other mobile phones or communications devices or terminals. The terminals 102 and 104 can be operated, e.g., by a user and a second user respectively (not shown). The terminals 102 and 104 are communicatively connected to an anchoring network device 106, e.g., via respective access networks 108 and 110. The anchoring network device 106 can include, e.g., an Access Transfer Control Function (ATCF) of an Internet Protocol (IP) Multimedia Subsystem (IMS) in a VoLTE-capable network. A telecommunications network can include, or can intercommunicate with or via, access networks 108 and 110.

The terminals 102 and 104 may be implemented as any suitable computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the terminals 102 and 104 as being "mobile" or "wireless," (e.g., configured to be carried and moved around), it is to be appreciated that the terminals 102 and 104 may represent various types of communication devices that are generally stationary as well, such as televisions, desktop computers, game consoles, set top boxes, and the like. In this sense, the terms "communication device," "wireless device," "wireline device," "mobile device," "computing device," "terminal," and "user equipment (UE)" may be used interchangeably herein to describe any communication device capable of performing the techniques described herein. In some examples, some terminals can have specific media handling requirements and thus only accept specific media codecs or components in a session description.

A communication session between terminals 102 and 104 is managed by signaling traffic, e.g., packets conveying instructions to set up or tear down the communication session. In some examples herein, signaling traffic is described in the context of the Session Initiation Protocol (SIP, RFC 3261). However, this is not limiting, and other signaling protocols and techniques can be used with, or to implement, functions described herein. SIP or other signaling traffic can include an initiation request from a calling terminal to a called terminal. Transmission of the initiation request, e.g., a SIP INVITE, begins a "pre-establishment" phase of the communication session. When the called terminal accepts the communication session, e.g., by transmitting a SIP 200 OK response, the communication session enters an "established" phase. During the established phase, data can be exchanged between participating terminals. In an example, the data includes digitized audio of a voice call. The pre-establishment phase corresponds to a SIP "early dialog state" and the established phase corresponds to a SIP "confirmed dialog state" (RFC 3261, §12).

In some examples, signaling traffic of a communication session, e.g., SIP requests and responses or other signaling traffic, may pass to or through anchoring network device 106 or other proxies, user-agent servers or clients, or back-to-back user agents (B2BUAs). As used herein, an "anchoring network device" is a network device through which signaling traffic for a communication session, e.g., SIP traffic, passes for the duration of an established phase of the communication session. That session is "anchored" at the anchoring network device. Anchoring signaling traffic for a session can increase network robustness by isolating the two sides of the anchoring network device. For example, terminal 102 is not required to change its SIP (or other signaling) route to terminal 104 when terminal 104 is handed over from access network 110 to another access network, since that SIP route between terminals 102 and 104 passes through anchoring network device 106. In some examples, anchoring takes place in response to receipt by anchoring network device 106 of a SIP INVITE, and the anchoring network device 106 transmits a SIP 183 Session in Progress once anchoring is complete, e.g., once anchoring network device 106 has recorded an indication that the communication session is anchored at that anchoring network device 106.

Example networks 108 or 110, or other networks carrying sessions, can include second-generation (2G) cellular networks such as the Global System for Mobile Communications (GSM) or third-generation (3G) cellular networks such as the Universal Mobile Telecommunications System (UMTS). Other example networks can include GSM EDGE Radio Access Network (GERAN), UMTS Terrestrial Radio Access Network (UTRAN), fourth-generation (4G) cellular networks, such as LTE carrying VoLTE sessions using SIP signaling, the PSTN using Signaling System 7 (SS7) signaling, and data networks, such as Institute of Electrical and Electronics Engineers (IEEE) 802.11 ("WIFI") networks carrying voice over Internet Protocol (VoIP) calls or other over-the-top (OTT) sessions encapsulating, e.g., voice or video data in a way transparent to an underlying packet transport.

When the first user desires to place a call to the second user, the terminal 102, e.g., in response to actuation by the first user of a "Send" control 112, transmits an initiation request 114 of a communication session. The terminal 102 is an example of a session-originating device, i.e., a terminal initiating a communication session with another terminal. Session-originating devices can include user equipment or other telecommunications or terminals communicatively connectable with other terminals via anchoring network device 106. Mobile phones and copper-loop landline phones can be examples of session-originating devices.

The initiation request 114, e.g., an outgoing voice call, includes information of a destination 116, e.g., a terminal 104 with which terminal 102 is requesting a session be established. In this example, only one destination is shown, namely the terminal 104. However, the initiation request 114 can specify any number of destinations. The initiation request 114 also includes information 118 indicating one or more media capabilities of the terminal 102. The information 118 of the one or more media capabilities is also referred to as an "offer." In an example, the initiation request 114 includes a SIP INVITE message having a Session Description Protocol (SDP) body including a session description, e.g., the information 118 of the one or more media capabilities. For example, the information 118 can include at least one SDP attribute ("a=") line, e.g., "a=rtpmap:42 amr-wb/16000" for AMR-WB at a 16 kHz sampling rate.

In some examples, the information 118 can indicate multiple codecs or other capabilities. In some examples, the information 118 can indicate priority relationships between the listed capabilities. For example, an SDP body can include a media description ("m=") line listing multiple formats, e.g., multiple codecs. The formats can be listed in descending order of priority, so that, e.g., the most preferred format is listed first on the "m=" line.

The anchoring network device 106 receives from the terminal 102 the initiation request 114 and performs offer processing 120, e.g., as described below with reference to FIG. 2. In some examples, the offer processing 120 modifies the information 118 of the one or more media capabilities. The anchoring network device 106 then transmits a second initiation request 122 including the modified information 124 of the one or more media capabilities to the destination, e.g., to the terminal 104, or to an anchoring network device corresponding to the destination, e.g., a serving call session control function (S-CSCF) communicatively connected with the terminal 104. In some examples, the anchoring network device 106 can include an Access Transfer Control Function (ATCF).

The terminal 104 thus receives an initiation request 122 including modified information 124 of the one or more media capabilities. The terminal 104 can respond, e.g., by alerting the second user and transmitting a SIP 180 Ringing response to the terminal 102. The user of the terminal 104 can then indicate the call should be accepted, e.g., by operating a call-acceptance control 126 such as a touch-screen button. The terminal 104 can then accept the initiation request, e.g., by sending a SIP 200 OK response to the terminal 102. Call initiation can be performed, e.g., as defined in the Global System for Mobile (GSM) or voice-over-Long Term Evolution (VoLTE) standards, and can include the exchange of additional messages (not shown) between the terminals 102 and 104 and the anchoring network device 106. Data of the session, such as audio data or video data formatted as specified in the modified information 124, can be exchanged between terminals 102 and 104 via a communications channel depicted as media path 128, which can pass through anchoring network device 106 or (as shown) can bypass anchoring network device 106.

In some examples, media path 128 can pass through a network gateway 130. For example, the network gateway 130 can include an Access Transfer Gateway (ATGW). The network gateway can perform packet processing 132 to modify ("rewrite") headers of packets passing through the network gateway 130. Packet processing 132 can be performed, e.g., to change between codecs of a codec pair, as described above and in more detail below. In some examples, anchoring network device 106 can provide to network gateway 130 information 134 of communication session(s), or media stream(s) within those session(s), for which the headers should be modified. As used herein, the term "network gateway" can indicate, but does not require that, network gateway 130 connects two different networks. Network gateway 130 can be configured to pass traffic between different networks or between different terminals in a particular network, in some nonlimiting examples.

Figure 2:
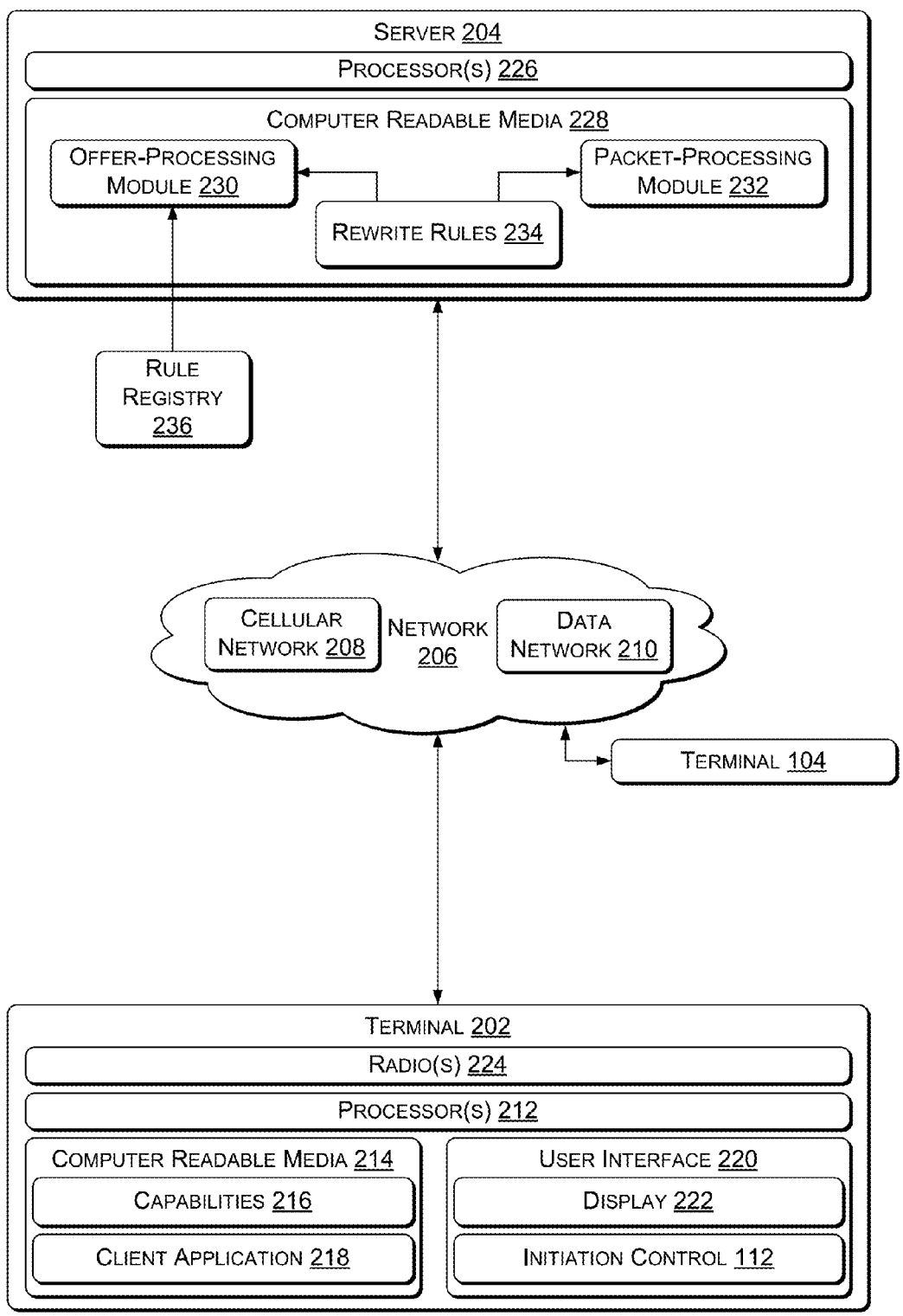
FIG. 2 is a block diagram illustrating a system for implementing capability-information modification according to some implementations.

FIG. 2 is a block diagram illustrating a telecommunication system 200 permitting capability-information modification and interworking using codec pairs according to some implementations. The system 200 includes a terminal 202, e.g., a wireless phone or other user equipment such as terminal 102 or 104, FIG. 1, coupled to a server 204 via a network 206. The server 204 can be an example of the anchoring network device 106, FIG. 1, e.g., an ATCF, or of the network gateway 130, FIG. 1, e.g., an ATGW. The network 206 can include one or more networks, such as a cellular network 208 and a data network 210. The network 206 can include one or more core network(s) connected to user equipment via one or more access network(s), e.g., access networks 108 or 110.

The cellular network 208 can provide wide-area wireless coverage using a technology such as GSM, Code Division Multiple Access (CDMA), UMTS, LTE, or the like. Example cellular networks 208 include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 204 and terminals such as the terminal 202 can additionally or alternatively be performed using other technologies, such as wired (Plain Old Telephone Service, POTS, or PSTN lines), optical (e.g., Synchronous Optical NETwork, SONET) technologies, and the like.

The data network 210 can include various types of networks for transmitting and receiving data (e.g., packets), including networks using technologies such as WIFI, IEEE 802.15.1 ("Bluetooth"), Asynchronous Transfer Mode (ATM), WIMAX, and other network technologies, e.g., configured to transport Internet Protocol (IP) packets. In some examples, the server 204 includes or is communicatively connected with an interworking function (IWF) or other device bridging networks, e.g., LTE, third-generation cellular (3G), and POTS networks. In some examples, the server 204 can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry packets using High Speed Packet Access (HSPA), LTE, or other technologies as well as voice traffic. Some cellular networks 208 carry both data and voice in a packet-switched format. For example, many LTE networks carry voice traffic in packets according to the voice-over-LTE (VoLTE) standard. Various examples herein provide origination and termination of, e.g., carrier-grade voice calls on, e.g., circuit-switched (CS) networks 206 or mixed VoLTE/3G networks 206, and on terminals 202 including original equipment manufacturer (OEM) handsets and non-OEM handsets.

The terminal 202 can be or include a wireless phone or any other type of terminal, such as discussed herein with reference to FIG. 1. The terminal 202 can include one or more processors 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Terminal 202 can include one or more computer readable media 214, such as memory (e.g., random access memory (RAM), solid state drives (SSDs), or the like), disk drives (e.g., platter-based hard drives), another type of computer-readable media, or any combination thereof.

The computer readable media 214 can be used to store data and to store instructions that are executable by the processors 212 to perform various functions as described herein. The computer readable media 214 can store various types of instructions and data, such as an operating system, device drivers, etc. The processor-executable instructions can be executed by the processors 212 to perform the various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 212. Tangible computer-readable media can include volatile and nonvolatile, removable and non-removable media implemented in any method or technology for storage of information, such as computer readable instructions, data structures, program modules, or other data.

The computer readable media 214 can store information 216 of one or more capabilities of the terminal 202. The information 216 can include, e.g., indications of voice or video codecs supported by the terminal 202.

The computer readable media 214 can include processor-executable instructions of a client application 218. The client application 218, e.g., a native or other dialer, can permit a user to originate and terminate communication sessions associated with the terminal 202, e.g., wireless phone. In some examples, the terminal 202 can transmit to the server 204 the initiation request 114 indicating the destination 116 and the information 118 of the capabilities, e.g., as discussed above with reference to FIG. 1.

The terminal 202 can further include a user interface (UI) 220, e.g., including a display 222, e.g., an electronic display device, a speaker, a vibration unit, a touchscreen, or other devices for presenting information to a user and receiving commands from the user. The user interface 220 can include a session-initiating user interface control 112, e.g., a touchscreen or physical button, to indicate a communication session should be initiated. The user interface 220 or components thereof, e.g., the display 222, can be separate from the terminal 202 or integrated with the terminal 202. The terminal 202 can further include one or more radio(s) 224 configured to selectively communicate wirelessly via the network 206, e.g., via an access network 108 or 110, or one or more transceivers (not shown) configured to selectively communicate using wired connections via the network 206.

The server 204 can include one or more processors 226 and one or more computer readable media 228. The computer readable media 228 can be used to store processor-executable instructions of an offer-processing module 230 (which can perform offer processing 120) or a packet-processing module 232 (which can perform packet processing 132). The processor-executable instructions can be executed by the processors 226 to perform various functions described herein. In some examples, server 204 includes either offer-processing module 230 or packet-processing module 232. In other examples, server 204 includes both offer-processing module 230 and packet-processing module 232.

In some examples, the computer readable media 228 or another component of the server 204 also stores rewrite rules 234, discussed below. In some examples, the server 204 is communicatively connected with a rule registry 236 separate from the server 204 that stores the rewrite rules 234. The server 204 can retrieve rewrite rules 234 or other information from the rule registry 236 via, e.g., a SIP MESSAGE request or an HTTP request such as a GET to a Web Services or Representational State Transfer (REST) application programming interface (API) endpoint. The server 204 can be configured to (e.g., by executing instructions stored in computer-readable media 228) retrieve from the rule registry 236 rewrite rules 234, e.g., corresponding to the initiation request 114.

The rewrite rules 234 (of which there can be one or more) can specify one or more capabilities to remove from the information of the one or more media capabilities. The one or more capabilities to remove can include, e.g., one or more codecs. The rewrite rules 234 can additionally or alternatively specify one or more capabilities to add to the information of the one or more media capabilities. The one or more capabilities to add can include, e.g., one or more codecs. The rewrite rules 234 can specify additions, deletions, modifications of codec type or parameters, or other changes. The rewrite rules 234 can specify that changes are contingent on certain conditions, or that specific rewrite rules apply only to specific conditions. For example, the rewrite rules 234 can specify that, if the highest-priority codec in the initiation request 114 is AMR-WB, the initiation request 122 should specify EVS IO mode as the highest-priority codec. The rewrite rules 234 can specify that a particular codec and its corresponding media description information should be removed from the offer. Media description information in an SDP body can include, e.g., lines beginning with "i=", "c=", "b=", "k=", or "a=" after an "m=" line and before the next consecutive "m=" line (RFC 4566, section 5, pg. 8). References herein to "rewrite rules" in the plural do not require that any described operation involve more than one of the rewrite rules 234, although operations may involve more than one of the rewrite rules 234. Of the rewrite rules 234, some may be applicable only to offers (e.g., block 314, FIG. 3), some may be applicable only to responses (e.g., block 404, FIG. 4), or some may be applicable to both offers and responses.

Still referring to FIG. 2 and also referring to FIG. 1, in some examples, offer-processing module 230 can modify the information 118 of the one or more media capabilities based at least in part on the rewrite rules 234 to determine the modified information 124. The server 204 can then transmit the initiation request 122 including the modified information 124 to terminal 104, e.g., via a second anchoring network device (omitted for brevity), e.g., on the terminating side of the session. For example, the second anchoring network device can be an S-CSCF of terminating user equipment or a Breakout Gateway Control Function (BGCF) for bridging calls to non-VoLTE networks. The second anchoring network device can receive the initiation request 122 from the server 204 and pass it to the terminal 104 (e.g., user equipment).

In some examples, packet-processing module 232 can receive packets from terminal 202 or terminal 104. Packet-processing module 232 can modify at least one header of a received packet to provide a modified packet. Packet-processing module 232 can then transmit the modified packet toward its destination (e.g., terminal 104 or terminal 202). Modifying information 118, and modifying headers of data packets, can permit terminals 102 and 104 to communicate without requiring transcoding. For example, using EVS and AMR-WB together in a communication session via techniques described herein can reduce packet jitter by taking advantage of EVS enhanced jitter buffer management. This can mitigate RF channel fluctuations, reduce the rate of lost packets, or increase audio quality. The EVS-capable terminal can also benefit from features of EVS such as lost-frame interpolation, voice activity detection (VAD), and comfort noise generation (CNG), even if the AMR-WB terminal cannot.

Moreover, using a common payload format can provide higher signal quality than can some transcoding schemes. Some transcoding schemes decompress content (e.g., audio) encoded in one format, then re-compress the content in another format. If the two formats (e.g., two different codecs) are lossy and have different frequency passbands or other limitations on fidelity, the transcoded content will be reduced in fidelity to the extent that the limitations on fidelity differ between the two formats (e.g., one format cuts off audio above 18 kHz and the other format cuts off audio below 50 Hz). Modifying headers without changing the payload can permit different formats to interoperate without this loss of fidelity.

Figure 3:
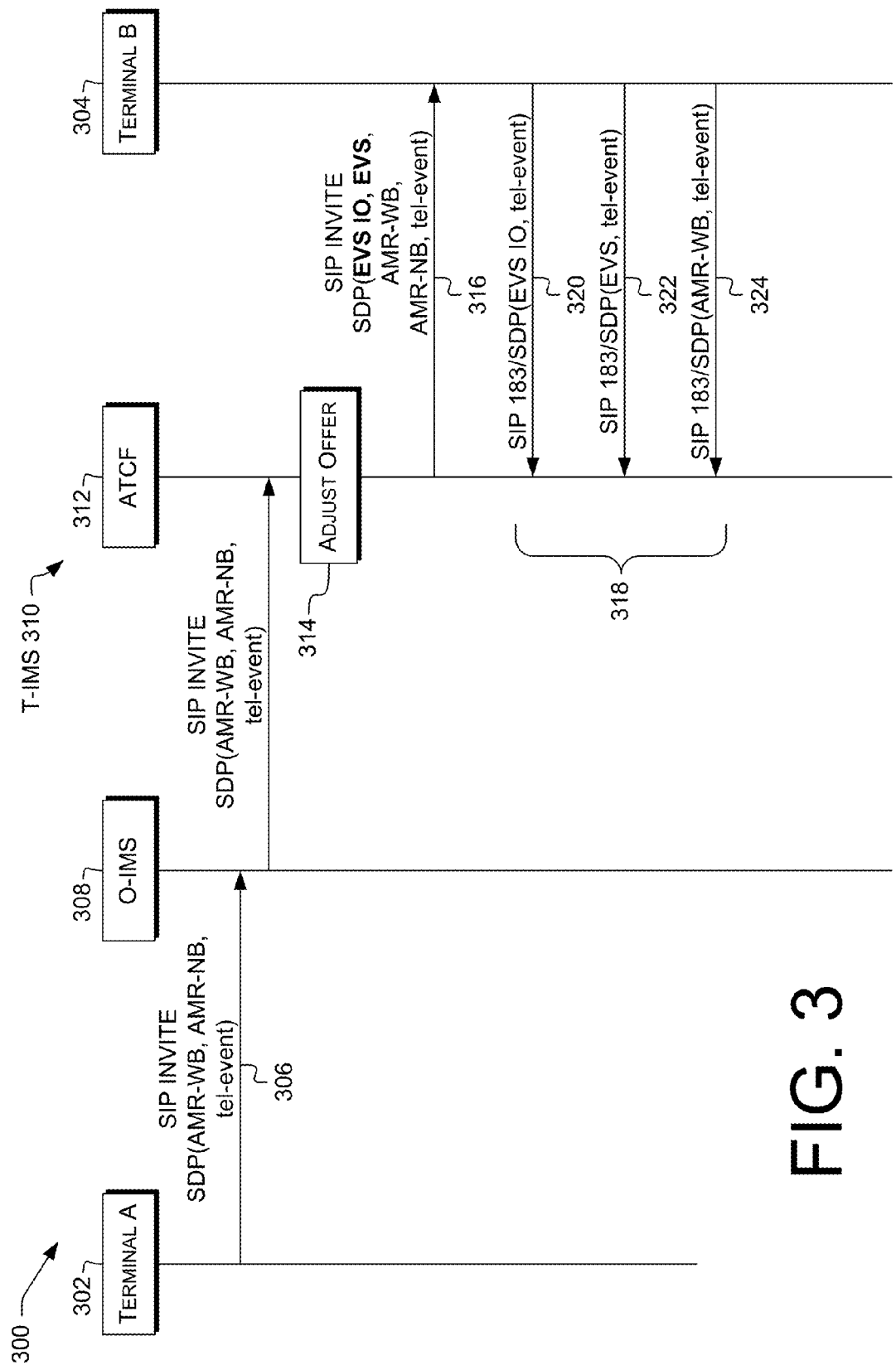
FIG. 3 shows an example call flow illustrating modification of media-capability information in an initiation request of a communication session.

FIG. 3 shows an example call flow 300 from a terminal 302, which can represent terminal 102, to a terminal 304, which can represent terminal 104. Example functions described herein with reference to FIG. 3 can be performed, e.g., by offer-processing module 230 of server 204 or another anchoring network device 106.

Terminal 302 sends an initiation request 306 in the form of a SIP INVITE with an SDP message body. Initiation request 306 can represent initiation request 114. In this example, the SDP body offers the AMR-WB, AMR-NB, and tel-event codecs. An originating IMS ("O-IMS") 308 forwards the initiation request 306 to a terminating IMS 310. In the illustrated example, the initiation request 306 reaches a terminating ATCF 312 of the terminating IMS 310. ATCF 312 can represent server 204 or another anchoring network device 106.

At block 314, the ATCF 312 retrieves, e.g., from the rule registry 236, rewrite rules 234, and modifies the information of the one or more media capabilities (e.g., in the SDP body), e.g., based at least in part on the rewrite rules 234. In this example, the rewrite rules 234 specify that if the first (highest-priority codec) is AMR-WB, EVS IO mode and EVS primary mode should be added to the front of the codec list as the new first- and second-highest-priority codecs, respectively. Accordingly, ATCF 312 determines the modified information 124 including a modified SDP body listing EVS IO mode, EVS primary mode, AMR-WB, AMR-NB, and tel-event. For example, EVS IO mode can be indicated by an encoding name of "EVS" and an "evs-mode-switch=1" format parameter (e.g., "a=fmtp:42 evs-mode-switch=1"). EVS primary mode can be indicated using an "evs-mode-switch=0" format parameter (e.g., "a=fmtp:42 evs-mode-switch=0"). ATCF 312 transmits to terminal 304 a second initiation request 316 in the form of a SIP INVITE including the modified SDP body. Second initiation request 316 can represent initiation request 122.

The preceding example of a rewrite is not limiting. In some examples, the rewrite rules 234 and specify that if the first (highest-priority codec) is AMR-WB, EVS 10 mode should be added to the front of the codec list as the new highest-priority codec. Other examples of rewrite rules 234 can add rules to the front or back of the codec list, or in the middle of the codec list, e.g., immediately before or after a specified codec.

Terminal 304 can respond to second initiation request 316 depending on the codec support of terminal 304, e.g., stored in information 216. FIG. 3 shows three alternatives 318. In an example in which terminal 304 supports EVS IO mode, terminal 304 responds with response 320, e.g., a SIP 183 Session in Progress response including an SDP body indicating support for EVS IO mode (e.g., including "a=rtpmap . . . EVS" and "a=fmtp . . . evs-mode-switch=1" lines). In an example in which terminal 304 supports EVS primary mode (the second-highest-priority codec offered in initiation request 316) but not EVS IO mode, terminal 304 responds with response 322, e.g., a SIP 183 with an SDP body indicating support for EVS primary mode (e.g., including an "a=itpmap . . . EVS" line but no "a=fmtp . . . evs-mode-switch" line, or an "a=rtpmap . . . EVS" and an "a=fmtp . . . evs-mode-switch=0" line). In an example in which terminal 304 does not support EVS but does support AMR-WB, terminal 304 selects the highest-priority codec it supports, here AMR-WB, and responds with response 324, e.g., a SIP 183 with an SDP body indicating support for AMR-WB (e.g., including an "a=rtpmap . . . AMR-WB" line but no "a=rtpmap . . . EVS" line).

In the example of FIG. 3, the originating terminal 302 supports AMR-WB and the terminating terminal 304 supports EVS IO mode (response 320). In some examples, the originating terminal 302 can support EVS IO mode and the terminating terminal 304 can support AMR-WB. Therefore, the ATCF 312 or other network devices, e.g., an ATCF of the originating IMS 308, can apply rewrite rules 234 as described with reference to ATCF 312.

Figure 4:
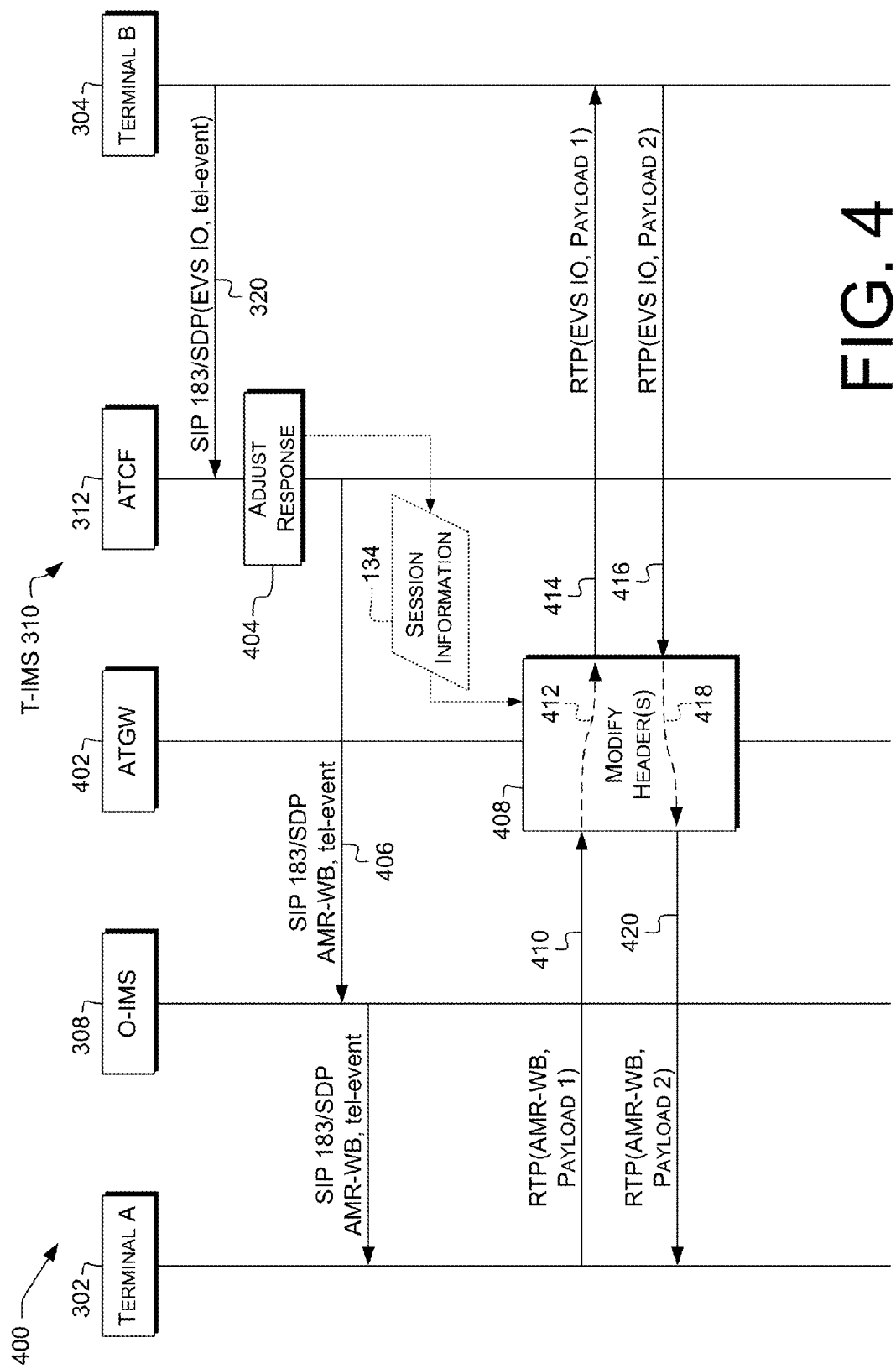
FIG. 4 shows an example call flow illustrating modification of media-capability information in an initiation response and data packets of the communication session of FIG. 3.

FIG. 4 shows an example call flow 400, e.g., beginning with response 320 (EVS 10 mode), FIG. 3. FIG. 4 shows terminal 302, O-IMS 308, ATCF 312, and terminal 304 as in FIG. 3. FIG. 4 also shows ATGW 402, which can represent server 204 or another network gateway 130, FIG. 1. Example functions described herein with reference to FIG. 4 can be performed by packet-processing module 232 of server 204 or another network gateway 130. In some examples, network gateway 130, e.g., ATGW 402, can be co-located with or incorporated into an anchoring network device 106, e.g., ATCF 312. Alternatively, ATCF 312 and ATGW 402 can be, or be incorporated into, distinct devices.

In some examples, at block 404, ATCF 312 can apply rewrite rules 234 to the response from terminal 304, e.g., response 320. In the illustrated example, terminal 304 supports EVS IO mode, and terminal 302 supports AMR-WB. ATCF 312 can rewrite the SDP body of the SIP 183 response 320 to provide response 406 indicating a selection of AMR-WB instead of EVS IO mode. For example, ATCF 312 can remove an "a=rtpmap . . . EVS" line and an "a=fmtp . . . evs-mode-switch" line in the SDP body of response 320 and insert an "a=rtpmap . . . AMR-WB" line to form response 406. O-IMS 308 can forward response 406 to terminal 302.

In some examples, block 404 can additionally or alternatively include providing information 134 of the communication session including initiation request 306 and response 320. At block 404, ATCF 312 can provide session information 134 (shown dashed solely for clarity) to ATGW 402.

In some examples, at block 408, ATGW 402 can modify a header of a packet from terminal 302 to terminal 304, or from terminal 304 to terminal 302. ATGW 402 can perform operations of block 408, e.g., in response to session information 134, or in accordance with predetermined criteria stored in other otherwise accessible to ATGW 402. In some examples, block 408 can include modifying headers only of packets to terminal 304, only of packets to terminal 302, or of packets in either direction. In some examples, block 408 can include modifying headers of packets of unicast or multicast communication sessions.

In some examples, session information 134 can indicate specific source or destination addresses or ports, or other criteria to determine which packets or packet types should be processed at block 408. For example, at block 404, ATCF 312 can determine the session information 134 based at least in part on address or port information in second initiation request 306 or 316, or response message 320, 322, or 324. ATGW 402 can then modify headers, at block 408, of packets, e.g., having source or destination addresses or ports indicated in the session information 134.

In an example of SIP, SDP using sendrecv (bidirectional) streams, and AMR-WB, initiation request 306 can include a "c=" line indicating a network address of terminal 302 (e.g., "c=IN IP4 192.168.13.37" for IPv4 address 192.168.13.37) and an "m=" line specifying that terminal 302 would like to receive audio on a specific port (e.g., "m=audio 49152 RTP/AVP 96" for User Datagram Protocol, UDP, port 49152). Response message 320 can include a "c=" line indicating a network address of terminal 304 (e.g., 10.42.42.42) and an "m=" line specifying that terminal 304 would like to receive audio on a specific port (e.g., UDP port 44100). ATCF 312 can provide the session information 134 including the addresses and ports to ATGW 402. ATGW 402 can then modify headers on packets, in this example, to 192.168.13.37:49152/udp (address:port/protocol) and to 10.42.42.42:44100/udp. ATGW 402 can, in some examples, forward unchanged (or with headers unmodified) packets not matching criteria indicated in the session information 134.

In an illustrated example, without limitation, packet 410 is a Real-time Transport Protocol (RTP) packet including an AMR-WB header and a payload ("Payload 1"). The payload can include a core frame representing audio. At block 408, operation 412, ATGW 402 can remove the AMR-WB header and insert an EVS IO header to provide packet 414, an RTP packet including an EVS IO header and the same payload as packet 410 (payload 1). In another illustrated example, packet 416 is an RTP packet including an EVS IO header and a payload ("Payload 2"). At block 408, operation 418, ATGW 402 can remove the EVS IO header and insert an AMR-WB header to provide packet 420, an RTP packet including an AMR-WB header and the same payload as packet 416 (payload 2).

In the examples of operations 412 and 418, the packet received by ATGW 402 (e.g., packet 410 or 416, respectively) is associated with a sending media capability, e.g., a specific codec. The packet transmitted by ATGW 402 (packet 414 or 420, respectively) is associated with a receiving media capability different from the sending media capability, e.g., a different codec. Both the packet received by ATGW 402 and the packet transmitted by ATGW 402 are associated with a single payload format, e.g., the AMR-WB core frame.

Figure 5:
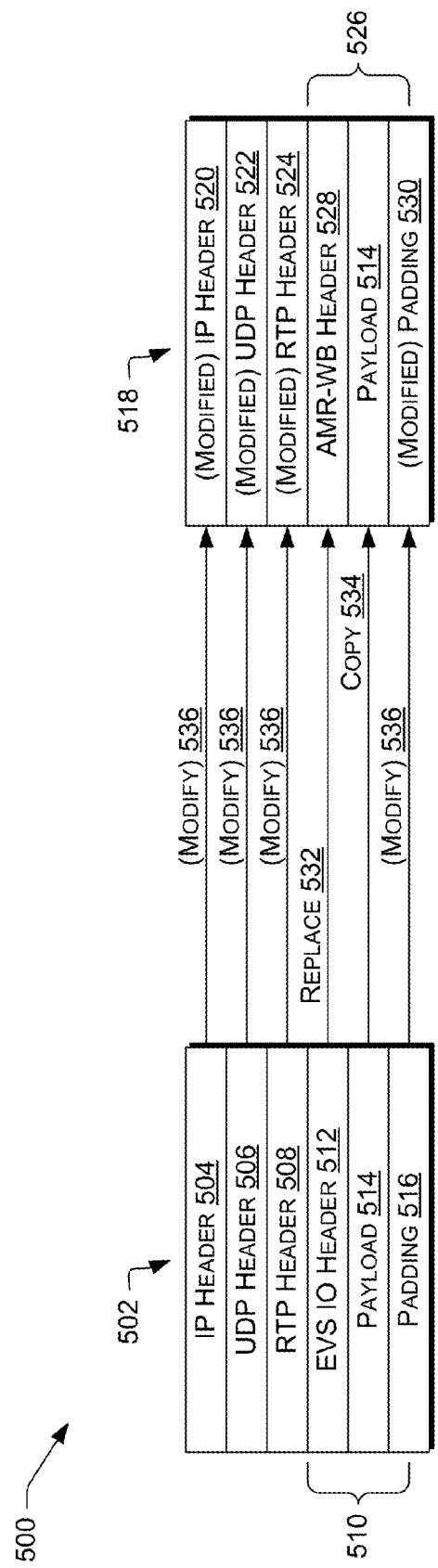
FIG. 5 shows an example of packets before and after processing as described with reference to FIG. 4.

FIG. 5 shows an example 500 of packets before and after processing at block 408, FIG. 4. Operations of example 500 can be performed, e.g., by ATGW 402 or another network gateway. Operations of example 500 can be applied to at least one packet with any destination, e.g., to both operations 412 and 418, FIG. 4. Example 500 is shown in the context of IP, UDP, SIP, SDP, EVS IO mode, and AMR-WB, but none of these is limiting.

Packet 502 represents a packet received for processing, e.g., packets 410 or 416, FIG. 4. Packet 502 includes, in order of transmission, IP header 504, UDP header 506, and RTP header 508. An RTP payload section 510 includes EVS IO mode header 512 and payload 514. Payload 514 may be followed by padding 516, e.g., as part of the RTP payload section 510 or after the RTP payload section 510.

Packet 518 represents a processed packet, e.g., packets 414 or 420, FIG. 4. Packet 518 includes, in order of transmission, IP header 520, UDP header 522, and RTP header 524. An RTP payload section 526 includes AMR-WB header 528 and payload 514. Payload 514 may be followed by padding 530, e.g., as part of the RTP payload section 526 or after the RTP payload section 526.

In some examples, block 408 can include operation 532 of replacing EVS IO mode header 512 in packet 502 with AMR-WB header 528 to determine packet 518. Operation 532 can include determining AMR-WB header 528 based at least in part on EVS IO mode header 512. For example, the EVS IO mode header 512 can be a Compact-format header (26.445 v13.1.0, §A.2.1.2) having a three-bit Codec Mode Request (CMR) field. Operation 532 can include determining AMR-WB header 528 including a four-bit CMR field (RFC 4867, §4.3.1) corresponding to the three-bit CMR field in the EVS IO mode header 512.

In some examples, block 408 can include operation 534 of copying payload 514 from packet 502 to packet 518. Since the payload 514 can be interpreted by either codec of a codec pair, operation 534 can be performed without transcoding or other computationally expensive operations.

In some examples, block 408 can include operation 536 of modifying other headers or portions of a packet in response to changes introduced by operation 532. For example, operation 532 may result in the RTP payload section 526 having a different size than the RTP payload section 510. This change in size may require changes to packet-size fields in other headers, or may require changes to the number of bits of padding 530 required. Therefore, operation 536 can include determining IP header 520 based at least in part on IP header 504, e.g., by copying or modifying IP header 504 as necessary for protocol compliance in view of the changes introduced by operation 532. Operation 536 can additionally or alternatively include likewise determining UDP header 522 based at least in part on UDP header 506, RTP header 524 based at least in part on RTP header 508, or padding 530 based at least in part on padding 516. In the figure, the indications "(Modify)" and "(Modified)" represent the fact that modifications may or may not be required for any particular portion of any particular packet, depending on the effects of operation 532 and the specific requirements and data formats of the codecs and protocols involved.

Figure 6A:
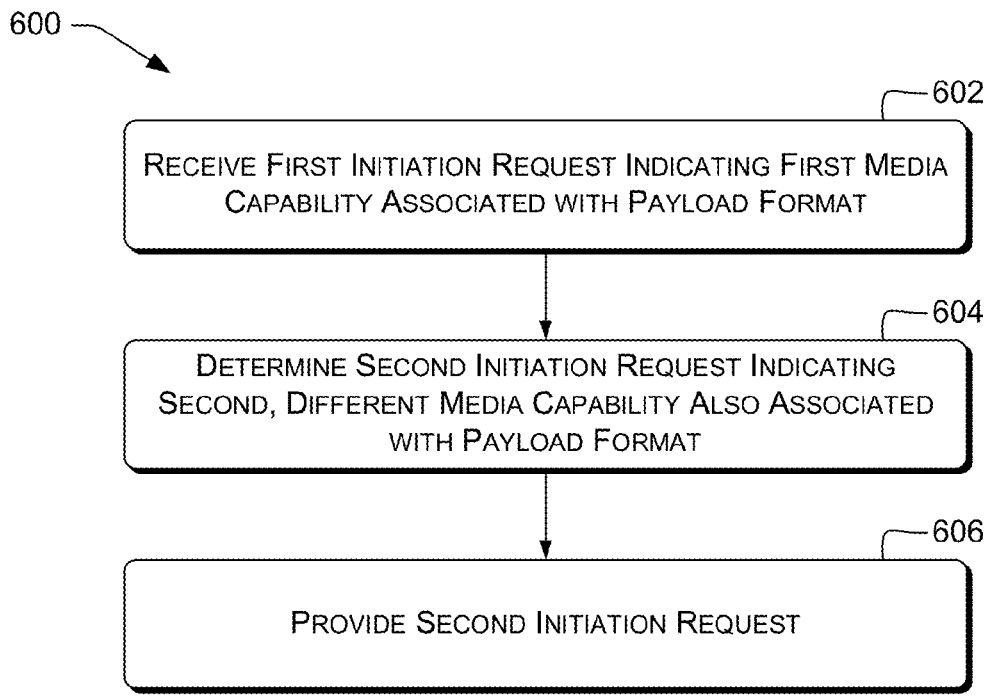
FIG. 6A illustrates an example process for interworking between two terminals during establishment of a communication session according to some implementations.

FIG. 6A illustrates an example process 600 for interworking between two terminals, e.g., terminals 302 and 304. Process 600 can be performed by an anchoring network device 106, e.g., ATCF 312. In some examples, the anchoring network device can include one or more processors configured to perform operations described below (or in FIG. 7, 9, or 10), e.g., in response to computer program instructions of the offer-processing module 230.

Operations shown in FIG. 6 and in FIGS. 7-12, discussed below, can be performed in any order except when otherwise specified, or when data from an earlier step is used in a later step. For clarity of explanation, reference is herein made to various components shown in FIGS. 1-5 that can carry out or participate in the steps of the exemplary method. It should be noted, however, that other components can be used; that is, exemplary method(s) shown in FIGS. 6-12 are not limited to being carried out by the identified components.

In some examples, at block 602, anchoring network device 106 can receive, from a first terminal 302, a first initiation request 306 of a communication session, e.g., a SIP INVITE. The anchoring network device 106 can receive the first initiation request 306 directly from the first terminal 302, or via at least one intervening device, e.g., of access network 108 or another network. Similarly, throughout the discussion of FIGS. 6-12, discussions of transmissions from specified origins or to specified destinations can include any number, zero or more, of intervening network devices.

The first initiation request 306 can indicate a first media capability, e.g., a codec such as AMR-WB. The first media capability can be indicated, e.g., in an SDP body of the SIP INVITE as discussed above. The first media capability can be associated with a payload format, e.g., an AMR-WB core frame. The payload format can describe at least part of the payload, e.g., not including codec headers. In the example of FIG. 5, the payload format can describe the payload 514 but not other portions of the RTP payload sections 510 or 526.

In some examples, at block 604, anchoring network device 106 can determine a second initiation request 316 based at least in part on the first initiation request 306. The second initiation request 316 can indicate a second media capability different from the first media capability and associated with the payload format. In the example of FIG. 3, the second media capability is EVS IO mode. The first media capability and the second media capability can be respective, different codecs of a codec pair, or can be other types of media capabilities that share a payload format. Examples are discussed above, e.g., with reference to block 314.

In some examples, at block 606, anchoring network device 106 can provide the second initiation request 316 to a second terminal 304. Block 606 can include providing the second initiation request 316 to the second terminal 304, e.g., directly, or via an S-CSCF, SCC AS, or other network device(s), as noted above.

Figure 6B:
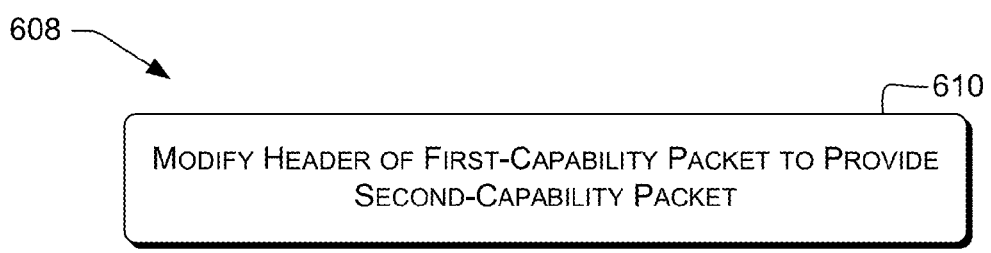
FIG. 6B illustrates an example process for interworking between two terminals during an established phase of a communication session according to some implementations.

FIG. 6B illustrates an example process 608 for interworking between two terminals, e.g., terminals 302 and 304. Process 608 can be performed by a network gateway 130, e.g., ATGW 402. In some examples, the network gateway 130 can include one or more processors configured to perform operations described below (or in FIG. 8, 11, or 12), e.g., in response to computer program instructions of the packet-processing module 232.

In some examples, at block 610, network gateway 130 can modify a header of a first packet, e.g., packet 410 or 416, to provide a second packet, e.g., packet 414 or 420, respectively. The network gateway 130 can apply session information 134 or rewrite rules 234 to select the first packet for modification, or to determine modification(s) to be made to the first packet. For example, block 610 can include changing, adding, deleting, or replacing codec header(s), RTP header(s), or other protocol header(s). In some examples, the first packet can be a packet received from a sending terminal. The sending terminal can be the first terminal 302 or the second terminal 304.

In some examples, the first packet is associated with a sending media capability (e.g., AMR-WB). The second packet is associated with a receiving media capability (e.g., EVS IO mode). Both the first packet and the second packet are associated with the payload format (e.g., AMR-WB core frame). The sending media capability can be one, and the receiving media capability the other, of the first media capability and the second media capability discussed above with reference to blocks 602 and 604. Using different media capabilities associated with a common payload format permits interworking with reduced computational burden or delay.

Figure 7:
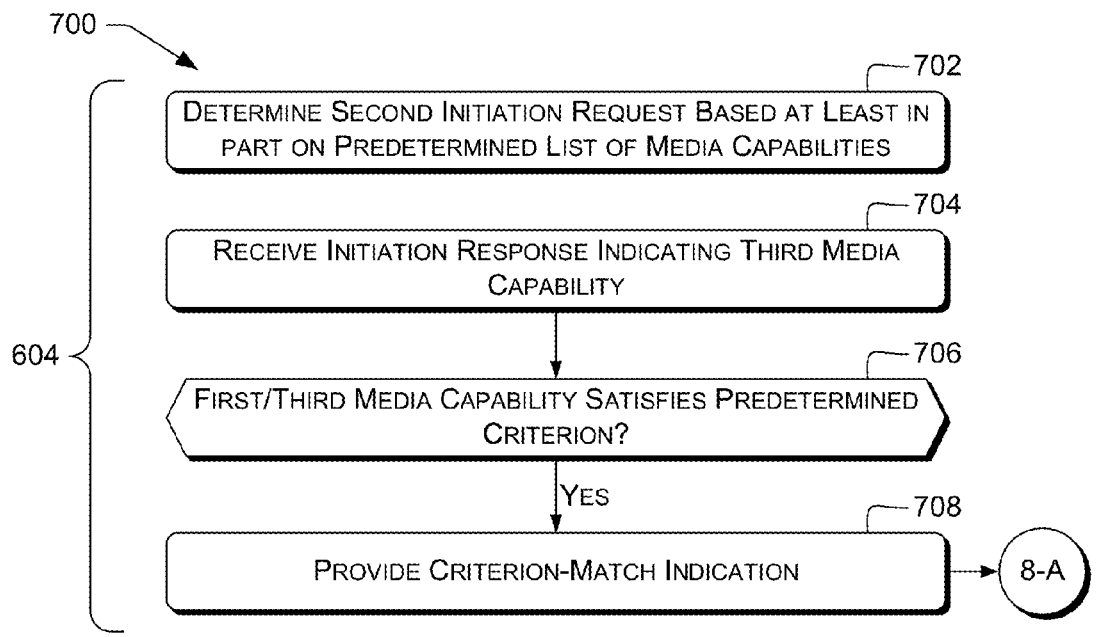
FIG. 7 illustrates an example process for interworking between two terminals during establishment of a communication session according to some implementations.

FIG. 7 illustrates an example process 700 for interworking between two terminals 302 and 304. Process 700 can be can be performed by an anchoring network device 106, e.g., ATCF 312. Block 604 can include at least one of blocks 702-708.

In some examples, at block 702, the anchoring network device 106 can determine the second initiation request 316 based at least in part on a predetermined list of acceptable media capabilities. For example, an operator of network 206 can define a set of requirements. Media capabilities not meeting those requirements can be removed from the first initiation request 306 to form the second initiation request 316. Information of the requirements can be stored, e.g., in the rewrite rules 234.

In some examples, at block 704, the anchoring network device 106 can receive an initiation response, e.g., a SIP 183 response such as response 320. The initiation response 320 can indicate a third media capability. The third media capability may match or differ from the first media capability or the second media capability.

In some examples, at block 706, the anchoring network device 106 can determine that at least one of the first media capability and the third media capability satisfies a predetermined criterion, e.g., stored in the rewrite rules 234. For example, the predetermined criterion can be that the first media capability be the AMR-WB codec and the third media capability be the EVS IO mode codec.

In some examples, at block 708, in response to the determination at block 706, the anchoring network device 106 can provide a criterion-match indication. In some examples, the anchoring network device 106 can store the criterion-match indication in the session information 134.

Figure 8:
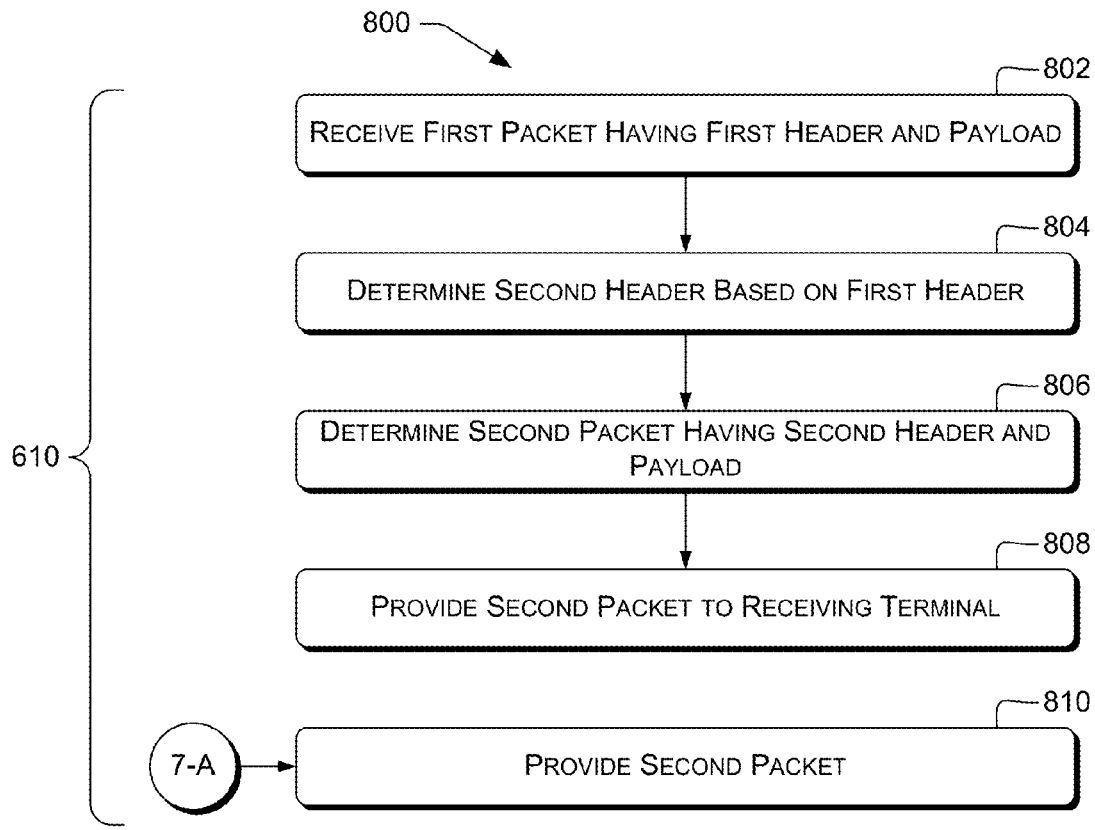
FIG. 8 illustrates an example process for interworking between two terminals during an established phase of a communication session according to some implementations.

FIG. 8 illustrates an example process 800 for interworking between two terminals 302 and 304. Process 800 can be can be performed by a network gateway 130, e.g., ATGW 402. Block 610 can include blocks 802-810.

In some examples, at block 802, the network gateway 130 can receive the first packet from the sending terminal. The first packet can include a first header, e.g., header 512, and a first payload, e.g., payload 514. The first payload can be associated with the payload format described herein with reference to block 602.

In some examples, at block 804, the network gateway 130 can determine a second header based at least in part on the first header. Examples are discussed herein, e.g., with reference to operation 532, FIG. 5. In some examples, at block 804, the network gateway 130 can replace a header of a first packet from the first terminal to provide a second packet, wherein the first packet is associated with the first media capability, the second packet is associated with the second media capability, and both the first packet and the second packet are associated with the payload format. In some examples, at block 804, the network gateway 130 can replace a header of a third packet from the second terminal to provide a fourth packet, wherein the third packet is associated with the second media capability, the fourth packet is associated with the first media capability, and both the third packet and the fourth packet are associated with the payload format.

In some examples, at block 806, the network gateway 130 can determine the second packet including the second header, e.g., AMR-WB header 528, and the first payload, e.g., payload 514. In some examples, the payload remains unchanged and only the headers are changed. In some of these examples, block 806 can include determining the second packet consisting of at least one header and the first payload.

In some examples, at block 808, the network gateway 130 can provide the second packet to a receiving terminal of the first terminal and the second terminal. The receiving terminal can be a different terminal from the sending terminal, within the bounds of the information available to the network gateway 130. For example, the second packet can be transmitted to a different network address than a source network address of the first packet. Block 808 can follow block 806, or can be used independently of block 806.

In some examples, at block 810, the network gateway 130 can provide the second packet in response to the criterion-match indication determined at block 708, FIG. 7. For example, the network gateway 130 can retrieve the criterion-match indication from the session information 134. Network gateway 130 can then provide the second packet, e.g., by performing processing of block 610, for communication sessions that match the criteria described herein with reference to block 706. This can reduce computational load on the network gateway 130 by removing the need to check inner packet headers (e.g., UDP ports or RTP payload types)

if no communication session requiring header rewriting is active for a particular source or destination address.

Figure 9:
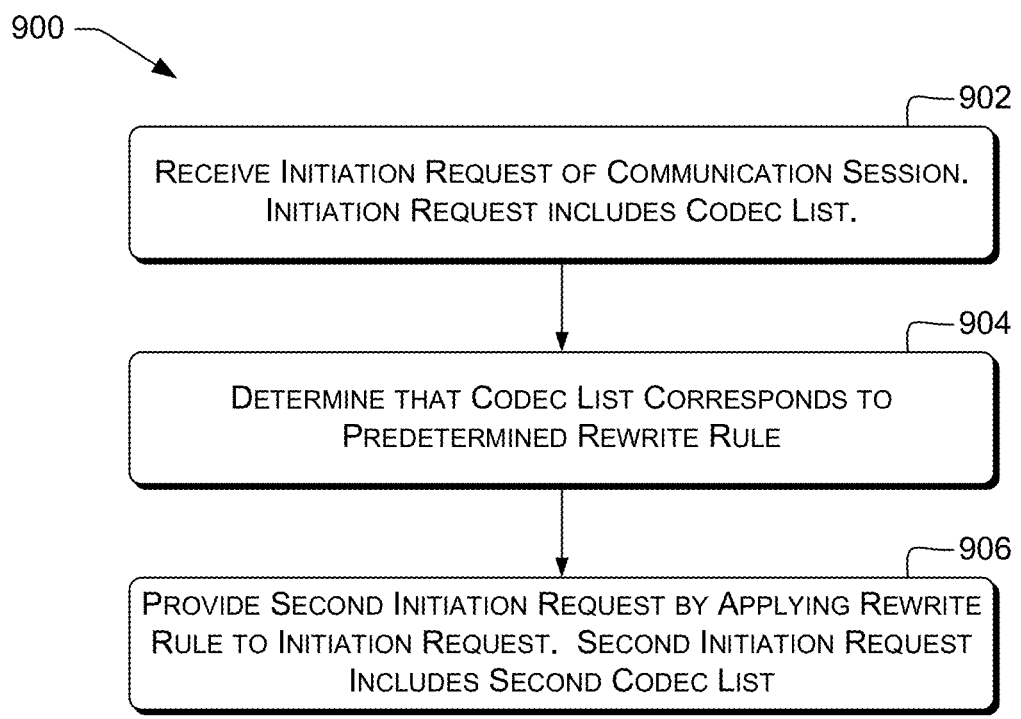
FIG. 9 illustrates an example process for interworking between two terminals and modifying an initiation request during establishment of a communication session according to some implementations.

FIG. 9 illustrates an example process 900 for interworking between two terminals 302, 304. Process 900 can be performed by an anchoring network device 106, e.g., ATCF 312.

In some examples, at block 902, the anchoring network device 106 can receive an initiation request 306 of a communication session. Examples are discussed above, e.g., with reference to block 602.

In some examples, at block 904, the anchoring network device 106 can determine that a codec list of the initiation request 306 corresponds to a predetermined rewrite rule 234 (or multiple rewrite rules 234, and likewise throughout the document). As used herein, a "list" can have one element or can have more than one element. The codec list can include at least one codec and can include a first codec, e.g., AMR-WB or EVS IO mode. Examples are discussed above, e.g., with reference to block 604. The rewrite rule 234 can specify alterations to the first codec in the codec list or other codecs. The rewrite rule 234 can be conditioned on a match between the codec list and at least one criterion specified in the rewrite rule. Instead of or in addition to a codec list, a rewrite rule 234 can be used to test or can be applied to a capability list of at least one media capability (and likewise throughout the document).

In some examples, at block 906, the anchoring network device 106 can apply the rewrite rule 234 to the initiation request 306 to provide a second initiation request 316 having a second codec list (or second capability list, and likewise throughout the document) including a second, different codec. The first codec and the second codec can both be associated with a common payload format. Examples are discussed above, e.g., with reference to block 604. In the example of FIGS. 3 and 4, the first codec list includes AMR-WB and the second codec list of second initiation request 316 includes EVS IO mode.

Figure 10:
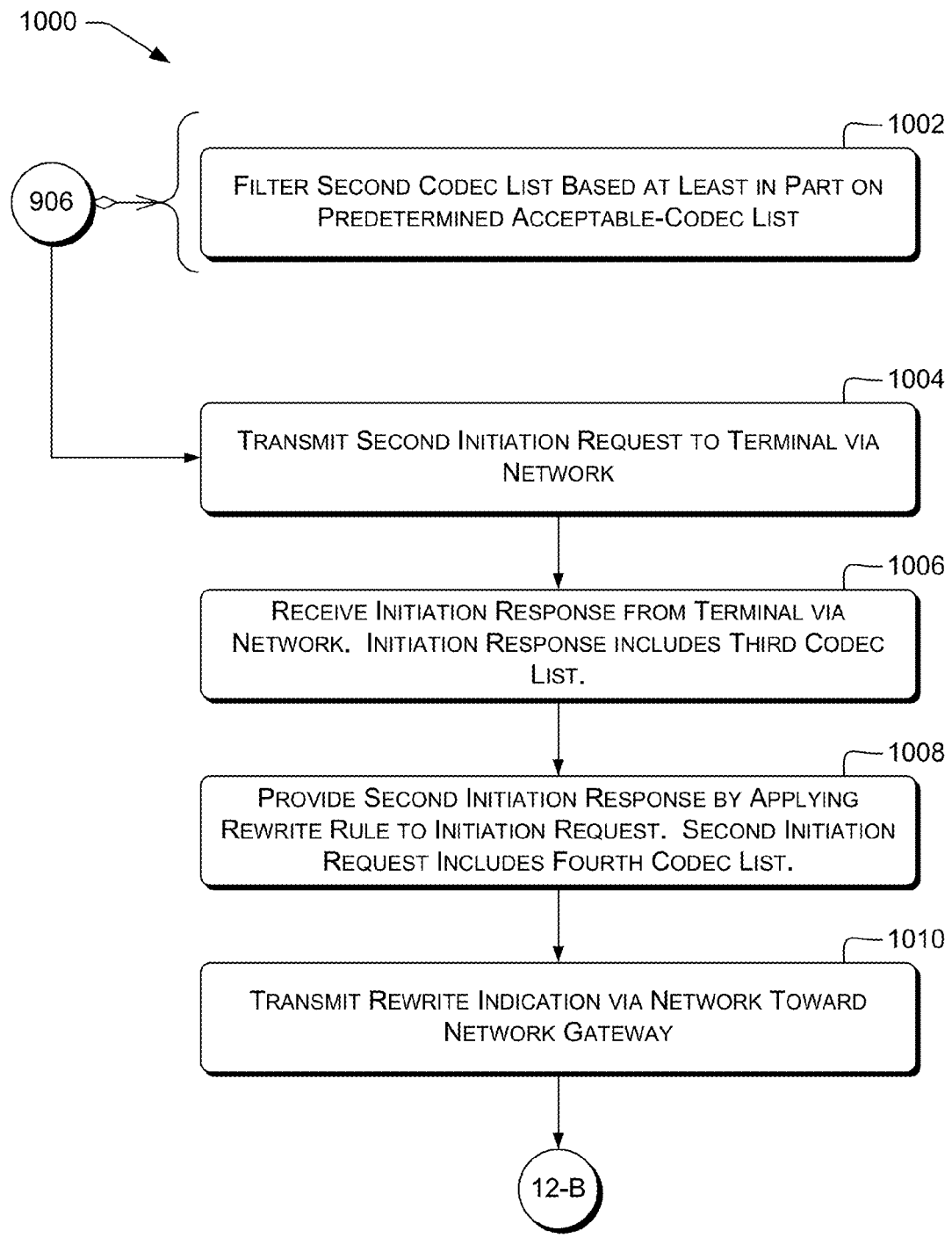
FIG. 10 illustrates an example process for interworking between two terminals during establishment of a communication session according to some implementations.

FIG. 10 illustrates an example process 1000 for interworking between two terminals 302, 304. Process 900 can be performed by an anchoring network device 106, e.g., ATCF 312. Block 906 can include block 1002. Block 906 can be followed by block 1004.

In some examples, at block 1002, the anchoring network device 106 can filter the second codec list discussed above with reference to block 906. Block 1002 can include filtering based on a predetermined acceptable-codec list. For example, if a network does not support the use of particular codecs, such as G.711 uncompressed audio, those codecs can be removed or omitted from the second codec list of the second initiation request 316. This can provide increased network control of bandwidth usage, and can reduce the probability of call failures due to use of codecs incompatible with core network device(s) such as media gateways.

In some examples, at block 1004, the anchoring network device 106 can transmit the second initiation request 316 via a network to (towards) a terminal, e.g., terminal 304.

In some examples, at block 1006, the anchoring network device 106 can receive an initiation response from the terminal via the network. The initiation response, e.g., response 320, 322, or 324, can include, e.g., a SIP 183 response. The initiation response can include a third codec list, e.g., an SDP body, having a third codec, e.g., EVS IO mode.

In some examples, at block 1008, the anchoring network device 106 can apply a second predetermined rewrite rule to the third codec list to provide a second initiation response including a fourth codec list having a fourth codec different from the third codec. The third codec and the fourth codec can both be associated with the common payload format. In some examples, block 1008 can include filtering the fourth codec list based on a predetermined acceptable-codec list, e.g., as discussed herein with reference to block 1002.

In some examples, at block 1010, the anchoring network device 106 can transmit a rewrite indication via a network toward a network gateway. The rewrite indication can be, include, or be included in session information 134. The rewrite indication is discussed below with reference to block 1202, FIG. 12.

Figure 11:
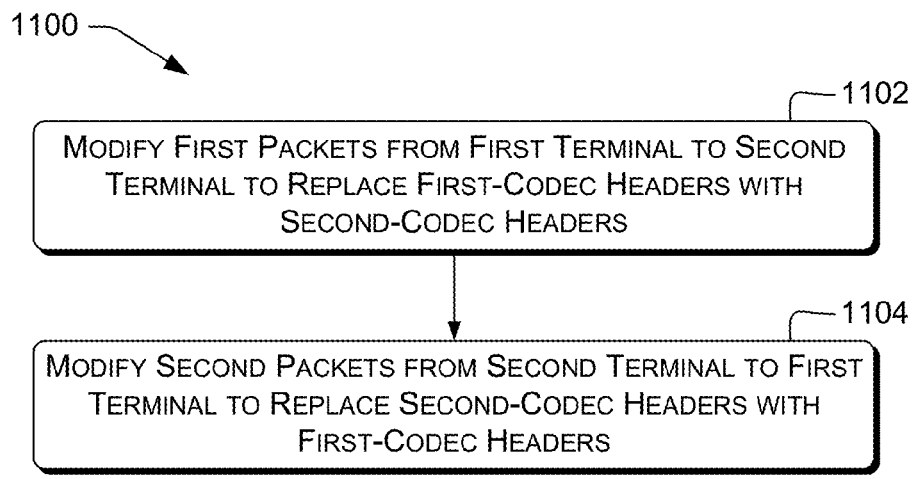
FIG. 11 illustrates an example process for interworking between two terminals and modifying headers during an established phase of a communication session according to some implementations.

FIG. 11 illustrates an example process 1100 for interworking between two terminals 302 and 304. Process 800 can be can be performed by a network gateway 130, e.g., ATGW 402. Blocks 1102 and 1104 can be performed in series, e.g., round-robin, in parallel, or any combination thereof. In some examples, a network gateway 130 can include hardware or processing resources for performing operations of block 1102 and can also include hardware or processing resources for performing operations of block 1104. In some examples, a network gateway 130 can include hardware or processing resources for performing operations of either block 1102 or block 1104.

In some examples, at block 1102, network gateway 130 can modify first packets originating at a first terminal 102 and intended for (e.g., having a destination field indicating an address of) a second terminal 104. Block 1102 can include replacing first-codec headers with second-codec headers, e.g., as discussed herein with reference to block 408. In some examples, the first codec and the second codec are both associated with a common payload format, e.g., an AMR-WB core frame. In some examples, block 1102 can include leaving respective payloads of the first packets unchanged.

In some examples, at block 1104, network gateway 130 can modify second packets originating at the second terminal 104 and intended for the first terminal 102. Block 1104 can include replacing second-codec headers with first-codec headers, e.g., as discussed herein with reference to block 408. In some examples, block 1104 can include leaving respective payloads of the second packets unchanged.

In some examples, process 1100 can include leaving respective payloads of the first packets and the second packets unchanged. In some examples of process 1100, the first codec and the second codec can have a common media type. For example, the first codec and the second codec can both be audio codecs, or can both be video codecs. In some examples, the first codec and the second codec have respective Multipurpose Internet Mail Extensions (MIME) types with the same type but different subtypes, e.g., audio/EVS and audio/AMR-WB. In some examples, the first codec and the second codec have different media types, e.g., audio and video respectively. In some examples, blocks 1102 or 1104 can include modifying packets or headers associated with the commonality, e.g., only modifying audio headers of an audio/video first codec if the second codec is an audio-only codec.

Figure 12:
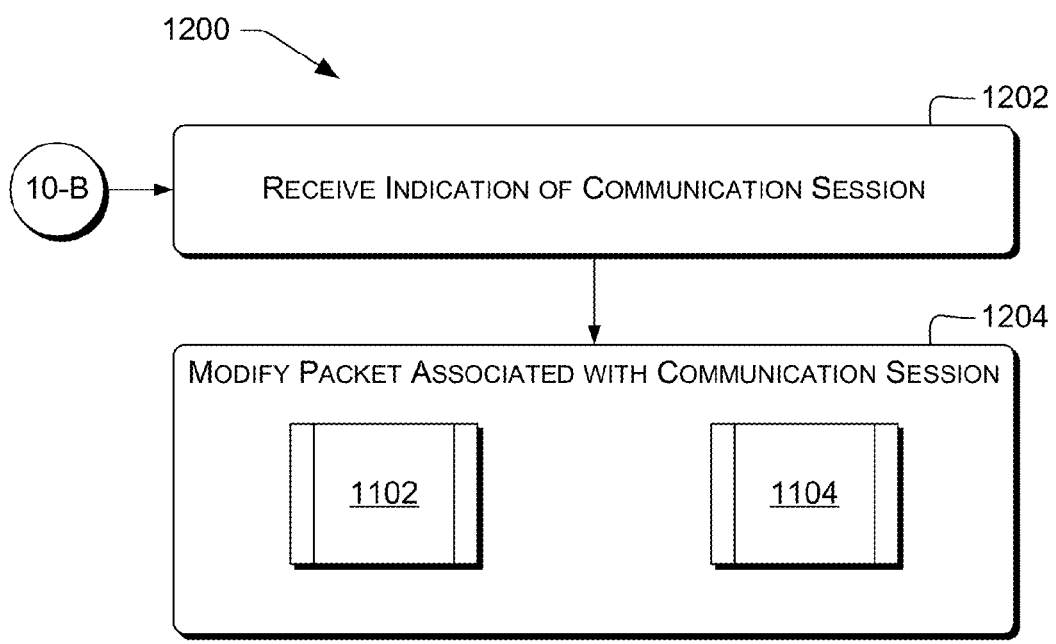
FIG. 12 illustrates an example process for interworking between two terminals during an established phase of a communication session in response to determinations at session establishment according to some implementations.

FIG. 12 illustrates an example process 1200 for interworking between two terminals 302 and 304. Process 800 can be can be performed by a network gateway 130, e.g., ATGW 402.

In some examples, at block 1202, network gateway 130 can receive an indication of a communication session. The indication can be, include, or be included in session information 134. For example, the indication can be a rewrite indication described herein with reference to block 1010.

In some examples, at block 1204, network gateway 130 can modify at least a third packet associated with the communication session in response to the indication. The third packet can be at least one of the first packets or the second packets. For example, block 1204 can include at least one of block 1102 or block 1104.

Example Clauses

A: A telecommunication system, comprising: an anchoring network device configured to: receive, from a first terminal, a first initiation request of a communication session, the first initiation request indicating a first media capability associated with a payload format; determine a second initiation request based at least in part on the first initiation request, the second initiation request indicating a second media capability different from the first media capability and associated with the payload format; and provide the second initiation request to a second terminal; and a network gateway configured to modify a header of a first packet from a sending terminal of the first terminal and the second terminal to provide a second packet, wherein: the first packet is associated with a sending media capability; the second packet is associated with a receiving media capability; both the first packet and the second packet are associated with the payload format; and the sending media capability is one, and the receiving media capability the other, of the first media capability and the second media capability.

B: The telecommunication system according to paragraph A, wherein the network gateway is further configured to provide the second packet to a receiving terminal of the first terminal and the second terminal, wherein the receiving terminal is different from the sending terminal.

C: The telecommunication system according to paragraph A or B, wherein the network gateway is further configured to: receive the first packet from the sending terminal, wherein the first packet includes a first header and a first payload, and the first payload is associated with the payload format; determine a second header based at least in part on the first header; and determine the second packet including the second header and the first payload.

D: The telecommunication system according to paragraph C, wherein the network gateway is further configured to determine the second packet consisting of at least one header and the first payload.

E: The telecommunication system according to any of paragraphs A-D, wherein: the anchoring network device is further configured to: receive an initiation response indicating a third media capability; determine that at least one of the first media capability and the third media capability satisfies a predetermined criterion; and provide a criterion-match indication; and the network gateway is configured to provide the second packet in response to the criterion-match indication.

F: The telecommunication system according to any of paragraphs A-E, wherein the anchoring network device includes an ATCF and the network gateway includes an ATGW.

G: The telecommunication system according to any of paragraphs A-F, wherein the initiation request includes a Session Initiation Protocol (SIP) INVITE message having a Session Description Protocol (SDP) body indicating the first media capability.

H: The telecommunication system according to paragraph G, wherein the first media capability and the second media capability include respective, different coding/decoding procedures (codecs).

I: The telecommunication system according to paragraph H, wherein the first media capability comprises an Adaptive Multi-Rate Wideband (AMR-WB) audio codec and the second media capability comprises an Enhanced Voice Services (EVS) Inter-Operable (IO) mode codec.

J: The telecommunication system according to any of paragraphs A-I, wherein the anchoring network device is further configured to determine the second initiation request based at least in part on a predetermined list of acceptable media capabilities.

K: A method, comprising: receiving an initiation request of a communication session; determining that a codec list of the initiation request corresponds to a predetermined rewrite rule, wherein the codec list includes a first codec; and applying the rewrite rule to the initiation request to provide a second initiation request having a second codec list including a second, different codec, wherein the first codec and the second codec are both associated with a common payload format.

L: The method according to paragraph K, further comprising transmitting the second initiation request via a network to a terminal.

M: The method according to paragraph L, further comprising: receiving an initiation response from the terminal via the network, the initiation response including a third codec list having a third codec; applying a second predetermined rewrite rule to the third codec list to provide a second initiation response including a fourth codec list having a fourth codec different from the third codec, wherein the third codec and the fourth codec are both associated with the common payload format.

N: The method according to paragraph M, further comprising filtering the fourth codec list based on a predetermined acceptable-codec list.

O: The method according to any of paragraphs K-N, further comprising transmitting a rewrite indication via a network toward a network gateway.

P: The method according to any of paragraphs K-O, further comprising filtering the second codec list based on a predetermined acceptable-codec list.

Q: A network gateway configured to: modify first packets originating at a first terminal and intended for a second terminal to replace first-codec headers with second-codec headers, wherein the first codec and the second codec are both associated with a common payload format; and modify second packets originating at the second terminal and intended for the first terminal to replace second-codec headers with first-codec headers.

R: The network gateway according to paragraph Q, further configured to leave respective payloads of the first packets and the second packets unchanged.

S: The network gateway according to paragraph Q or R, further configured to: receive an indication of a communication session; and modify at least a third packet associated with the communication session in response to the indication, wherein the third packet is at least one of the first packets or the second packets.

T: The network gateway according to any of paragraphs Q-S, wherein the first codec and the second codec have a common media type.

U: A computer-readable medium, e.g., a computer storage medium, having thereon computer-executable instructions, the computer-executable instructions upon execution configuring a computer to perform operations as any of paragraphs K-P recites.

V: A device comprising: a processor; and a computer-readable medium, e.g., a computer storage medium, having thereon computer-executable instructions, the computer-executable instructions upon execution by the processor configuring the device to perform operations as any of paragraphs K-P recites.

W: A system comprising: means for processing; and means for storing having thereon computer-executable instructions, the computer-executable instructions including means to configure the system to carry out a method as any of paragraphs K-P recites.

Conclusion

In the figures, example data transmissions (parallelograms), example data exchanges in call flow diagrams, and example blocks in process diagrams represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions are described is not intended to be construed as a limitation, and any number of the described transmissions can be combined in any order and/or in parallel to implement the processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunication system, comprising:
   an Access Transfer Control Function (ATCF) configured to:
      receive, from a first terminal, a first initiation request of a communication session, the first initiation request indicating a first media capability associated with a payload format, wherein a pre-establishment phase of the communication session begins with transmission of the first initiation request;
      determine, during the pre-establishment phase, a second initiation request based at least in part on the first initiation request, the second initiation request indicating a second media capability different from the first media capability and associated with the payload format;
      provide, during the pre-establishment phase, the second initiation request to a second terminal;
      receive, during the pre-establishment phase, an initiation response indicating a third media capability;
      determine, during the pre-establishment phase, that at least one of the first media capability and the third media capability satisfies a predetermined criterion; and
      in response, provide, during the pre-establishment phase, a criterion-match indication; and
   an Access Transfer Gateway (ATGW) configured to, in response to the criterion-match indication, modify a header of a first packet from a sending terminal of the first terminal and the second terminal by replacing a first-capability header of the first packet with a second-capability header to provide a second packet,
   wherein:
      the first packet and the first-capability header are associated with a sending media capability;
      the second packet and the second-capability header are associated with a receiving media capability;
      both the first packet and the second packet are associated with the payload format; and
      the sending media capability is one, and the receiving media capability the other, of the first media capability and the second media capability.

2. The telecommunication system according to claim 1, wherein the ATGW is further configured to provide the second packet to a receiving terminal of the first terminal and the second terminal, wherein the receiving terminal is different from the sending terminal.

3. The telecommunication system according to claim 1, wherein the ATGW is further configured to:
   receive the first packet from the sending terminal, wherein the first packet includes a first header and a first payload, and the first payload is associated with the payload format;
   determine a second header based at least in part on the first header; and
   determine the second packet including the second header and the first payload.

4. The telecommunication system according to claim 3, wherein the ATGW is further configured to determine the second packet consisting of at least one header and the first payload.

5. The telecommunication system according to claim 1, wherein the initiation request includes a Session Initiation Protocol (SIP) INVITE message having a Session Description Protocol (SDP) body indicating the first media capability.

6. The telecommunication system according to claim 5, wherein the first media capability and the second media capability include respective, different coding/decoding procedures (codecs).

7. The telecommunication system according to claim 6, wherein the first media capability comprises an Adaptive Multi-Rate Wideband (AMR-WB) audio codec and the second media capability comprises an Enhanced Voice Services (EVS) Inter-Operable (IO) mode codec.

8. The telecommunication system according to claim 1, wherein the ATCF is further configured to determine the second initiation request based at least in part on a predetermined list of acceptable media capabilities.

9. A method, comprising:
- receiving an initiation request of a communication session, wherein a pre-establishment phase of the communication session begins with transmission of the initiation request;
- retrieving, from a rule registry via a network, a plurality of rewrite rules;
- determining, during the pre-establishment phase, that a codec list of the initiation request corresponds to a rewrite rule of the plurality of rewrite rules, wherein the codec list includes a first codec;
- applying, during the pre-establishment phase, the rewrite rule to the initiation request to provide a second initiation request having a second codec list including a second, different codec, wherein the first codec and the second codec are both associated with a common payload format; and
- transmitting, during the pre-establishment phase, a rewrite indication via a network toward a network gateway.

10. The method according to claim 9, further comprising transmitting the second initiation request via a network to a terminal.

11. The method according to claim 10, further comprising:
- receiving an initiation response from the terminal via the network, the initiation response including a third codec list having a third codec;
- applying a second predetermined rewrite rule to the third codec list to provide a second initiation response including a fourth codec list having a fourth codec different from the third codec, wherein the third codec and the fourth codec are both associated with the common payload format.

12. The method according to claim 11, further comprising filtering the fourth codec list based on a predetermined acceptable-codec list.

13. The method according to claim 9, further comprising filtering the second codec list based on a predetermined acceptable-codec list.

14. An Access Transfer Gateway (ATGW) comprising:
- one or more processors; and
- one or more non-transitory computer readable media storing instructions that, when executed by the one or more processors, cause the one or more processors to:
  - receive, during a pre-establishment phase of a communication session, an indication of the communication session; and
  - modify, during an established phase of the communication session, first packets originating at a first terminal and intended for a second terminal by replacing at least one first-codec header with at least one second-codec header, wherein the first codec and the second codec are both associated with a common payload format; and
  - modify, during an established phase of the communication session, second packets originating at the second terminal and intended for the first terminal by replacing at least one second-codec header with at least one first-codec header.

15. The ATGW according to claim 14, wherein the instructions further cause the one or more processors to leave respective payloads of the first packets and the second packets unchanged.

16. The network gateway ATGW according to claim 14, wherein the instructions further cause the one or more processors to:
- modify at least a third packet associated with the communication session in response to the indication, wherein the third packet is at least one of the first packets or the second packets.

17. The ATGW according to claim 14, wherein the first codec and the second codec have a common media type.

* * * * *